Patented Oct. 3, 1950

2,524,611

UNITED STATES PATENT OFFICE 2,524,611

ELECTRIC RESISTANCE AND METHOD OF MAKING

Evert Johannes Willem Verwey and Marinus Gerard van Bruggen, Eindhoven, Netherlands, assignors, by mesne assignments, to Hartford National Bank and Trust Company, Hartford, Conn., as trustee No Drawing. Application January 14, 1946, Serial No. 641,181. In the Netherlands August 22, 1941

Section 1, Public Law 690, August 8, 1946
Patent expires August 22, 1961

7 Claims. (Cl. 106—39)

For manufacturing electric resistances having a negative temperature coefficient various combinations of $Fe_3O_4$ with double oxides having a spinel structure similarly to $Fe_3O_4$ have been suggested.

It has now been found that the combination $FeO$—$Fe_2O_3$—$MgO$—$Al_2O_3$ is of particular advantage provided the initial substances are converted into a sintered material consisting of a uniform spinel phase and this is done in such manner that at a temperature of about 500° C. the material is not supersaturated with a second phase. For this, it is generally necessary that the molecular ratio between the total quantities of bivalent and trivalent oxides is not different from 1 or only to a slight extent.

If this condition is satisfied a second phase which would cause undesired variations of the resistance cannot separate out at operating temperatures in excess of 500° C. As far as the region below 500° C. is concerned it should be mentioned that below temperatures of this order of magnitude the velocity of separation of a second phase is very low with a resistance material according to the invention.

In accordance with the foregoing it is necessary according to the invention so to choose the conditions of sintering, to wit the temperature and the partial pressure of the oxygen in the surrounding gas, that the molecular ratio $FeO:Fe_2O_3$ required for the said desideratum is adjusted in the material. In order that during the subsequent cooling this ratio may be preserved to the best possible extent cooling may be effected rapidly with the simultaneous replacement of the oxygenous atmosphere by an inert gas or both the heating and the rapid cooling may be effected in an atmosphere in which the partial pressure of the oxygen decreases when the temperature falls, for example in a mixture of nitrogen and water vapor.

The specific resistance of the resistors according to the invention is solely governed by the mixing ratio of the constituents and primarily by the content of iron oxide in the spinel form. Generally, this content will be less than 50 mol. per cent for obtaining values of practical use for the specific resistance.

The resistance material according to the invention offers the advantage that at comparatively high load chemical conversions (for example separation of oxygen when on load in a vacuum or in an inert gas, oxidation under the influence of the air oxygen) that would result in variation of the resistance value do not occur. This favourable property is apparently governed by the presence of magnesia spinel which by itself is not oxidisable or reducible and has such a high melting point that at high temperatures the velocity of the diffusion and of the reaction of the atoms of the mixed crystal containing $FeO+Fe_2O_3$ is of slight magnitude.

By reason of the particular, limited field of compositions of the quaternary system $$MgO—Al_2O_3—FeO—Fe_2O_3$$

according to the invention the additional advantage is achieved, as indicated before, that at high load temperatures a variation in the resistance which might be induced by a separation of a second phase which would otherwise occur does also not ensue.

Moreover, the temperature coefficient of the resistance of the material according to the invention is very much negative for a given value of the specific resistance.

With the same resistance value the melting point of the material may slightly vary in accordance with the composition. The materials having the highest melting point and being chemically most resistant, are obtained when the molecular ratio $MgO:Al_2O_3$ is in the neighbourhood of 1. In that case also a molecular ratio $FeO:Fe_2O_3$ in the neighbourhood of 1 is necessarily desired. Variations in the partial pressure of the oxygen in the sintering atmosphere, as may occur during manufacture, produce but slight differences in the value of the specific resistance with materials thus composed and this results technically in the advantage of high reproducibility in sintering.

Since the ratio $FeO:Fe_2O_3$ is controlled by the choice of the gas atmosphere and the sintering temperature any form of iron oxide and, if desired iron powder may be used as the initial material for the resistances according to the invention; the $MgO+Al_2O_3$ may be used wholly or in part as magnesia spinel. In addition, the oxides concerned may be isomorphously replaced for a small part by other oxides. If an initial mixture sinters at very high temperature it may be desirable for example for reasons of ease of manufacture that a small quantity of a sintering agent should be used.

The resistances according to the invention may be used for example for the elimination of voltage pulses and as compensation resistances.

In order that the invention may be clearly understood and readily carried into effect it will now be described more fully with reference to two practical examples.

*Example I*

MgO and $Al_2O_3$ in a molecular ratio 1:1 fired at about 1000° C. and $Fe_2O_3$ is ground with water in an iron ball mill. The composition of the initial mixture is so chosen that a material is obtained in which the ratio of the number of gramme-molecules $MgO+Al_2O_3$ (calculated as $MgAl_2O_4$) to the number of molecules of iron oxide (calculated as $Fe_3O_4$) is 2.5. The material is then moulded with the addition of an organic binder to rods of 8 mms. in diameter and 8 mms. in length and sintered for 30 minutes at 1570° C. (black-body temperature, i. e. the equivalent temperature of an ideal heat-radiator, a black body) in an atmosphere of nitrogen passed through water of 40° C. The sintering operation is carried out in an electric furnace in a vessel of thoria, which material does not react to any appreciable extent with the resistance material. Subsequent to sintering cooling is effected rapidly by pushing the vessel into a cold part of the furnace.

The resistance value at ordinary temperatures of a resultant rod is 2500Ω. At a load with 100 ma. of such a resistance rod which is provided with nickel leading-in wires of 0.5 mm. in thickness the voltage across the resistance is 13 volts (resistance 130Ω). At a load with 6 watts the temperature at the centre of the rod mounts to about 500° C., whilst at the same time the resistance value decreases to 13Ω. At this very high load in air for 24 hours the resistance value remains unvaried with a measuring accuracy of 1%.

*Example II*

Except for the ratio $MgAl_2O_4:Fe_3O_4$ which in the present case is 2:1 the composition of the initial mixture is chosen to be quite identical with that of Example I. This material is then moulded with the use of an organic binder to tubes of 12 mms. in internal diameter and 16 mms. in external diameter. These tubes are suspended in a vertically arranged furnace and sintered for 30 minutes at 1540° C. in an atmosphere of nitrogen containing 1% of oxygen. The oxygenous atmosphere is next replaced by pure dry nitrogen and the tubes are rapidly cooled by dropping them after about 30 seconds into a cold part of the furnace. After internally and externally silver-plating and dividing of the tubes into lengths of 40 mms. resistances of a value of 10Ω at 30° C. and of 1.8Ω at 100° C. are obtained.

What we claim is:

1. A negative temperature coefficient electrical resistance element consisting of a sintered mass of mixed crystals of FeO, $Fe_2O_3$, MgO, and $Al_2O_3$, in which the molecular ratio of $$(MgO+FeO):(Al_2O_3+Fe_2O_3)$$

is approximately unity and which contains less than 50 mol. per cent of iron oxide in spinel form $(Fe_3O_4)$, said sintered mass having a uniform spinel phase which is less than supersaturated with a second phase at a temperature of about 500° C.

2. A negative temperature coefficient electrical resistance element consisting of a sintered mass of mixed crystals of FeO, $Fe_2O_3$, MgO, and $Al_2O_3$, in which the molecular ratio of $MgO:Al_2O_3$ is approximately unity and which contains less than approximately 50 mol. percent of iron oxide in spinel form $(Fe_3O_4)$, said sintered mass having a uniform spinel phase which is less than supersaturated with a second phase at a temperature of about 500° C.

3. A negative temperature coefficient electrical resistance element consisting of a sintered mass of mixed crystals of FeO, $Fe_2O_3$, MgO, and $Al_2O_3$, in which the molecular ratios of $MgO:Al_2O_3$ and of $FeO:Fe_2O_3$ are respectively approximately unity and which contains less than approximately 50 mol. per cent of iron oxide in spinel form $(Fe_3O_4)$, said sintered mass having a uniform spinel phase which is less than supersaturated with a second phase at a temperature of about 500° C.

4. A negative temperature coefficient electrical resistance element consisting of a sintered mass of mixed crystals of FeO, $Fe_2O_3$, MgO, and $Al_2O_3$, in which the molecular ratios of $MgO:Al_2O_3$ and $FeO:Fe_2O_3$, respectively, are approximately unity and the gram-molecular ratio $$MgO+Al_2O_3:FeO+Fe_2O_3$$

is approximately 2.5:1, said sintered mass having a uniform spinel phase which is less than supersaturated with a second phase at temperatures of about 500° C.

5. A negative temperature coefficient electrical resistance element consisting of a sintered mass of mixed crystals of FeO, $Fe_2O_3$, MgO, and $Al_2O_3$, in which the molecular ratios of $MgO:Al_2O_3$ and $FeO:Fe_2O_3$, respectively, are approximately unity and the gram-molecular ratio of $$(MgO+Al_2O_3):(FeO+Fe_2O_3)$$

is approximately 2:1, said sintered mass having a uniform spinel phase which is less than supersaturated with a second phase at a temperature of about 500° C.

6. A method of manufacturing an electrical resistance element having a negative temperature coefficient of resistance comprising the steps of mixing powdered MgO and $Al_2O_3$ in the molecular ratio of approximately 1:1 and $Fe_2O_3$ computed on the basis of $Fe_3O_4$ in the gram-molecular ratio of 2.5:1 between the MgO and $Al_2O_3$ and the $Fe_2O_3$, and sintering the mixture at a temperature of approximately 1570° C. in a nitrogen atmosphere substantially free of oxygen to form a sintered mass of mixed crystals of MgO, $Al_2O_3$, FeO, and $Fe_2O_3$ in which the molecular ratios of $MgO:Al_2O_3$ and $FeO:Fe_2O_3$ are approximately unity and which contains less than 50 mol. percent of iron oxide in spinel form.

7. A method of manufacturing an electrical resistance element having a negative temperature coefficient of resistance comprising the steps of mixing powdered MgO and $Al_2O_3$ in the molecular ratio of approximately 1:1 and $Fe_2O_3$ computed on the basis of $Fe_3O_4$ in the gram-molecular ratio of 2:1 between the MgO and $Al_2O_3$ and the $Fe_2O_3$, sintering the mixture at a temperature of approximately 1540° C. in an atmosphere of nitrogen which is substantially free of oxygen, and cooling the sintered mass thus formed in an atmosphere of nitrogen to form a sintered mass of mixed crystals of FeO, $Fe_2O_3$, MgO, and $Al_2O_3$, in which the molecular ratios of $MgO:Al_2O_3$ and $FeO:Fe_2O_3$ are approximately unity and the iron oxide in spinel form is less than approximately 50 mol. percent.

EVERT JOHANNES WILLEM VERWEY.
MARINUS GERARD van BRUGGEN.

REFERENCES CITED

The following references are of record in the file of this patent:

UNITED STATES PATENTS

| Number | Name | Date |
|---|---|---|
| 860,997 | Steinmetz | July 23, 1907 |
| 2,027,413 | Andres | Jan. 14, 1936 |
| 2,048,263 | Haglund | July 21, 1936 |
| 2,370,443 | Biefeld | Feb. 27, 1945 |

FOREIGN PATENTS

| Number | Country | Date |
|---|---|---|
| 523,051 | Great Britain | July 4, 1940 |